United States Patent
Meyer et al.

(10) Patent No.: US 11,046,299 B2
(45) Date of Patent: Jun. 29, 2021

(54) METHODS AND SYSTEM FOR OPERATING A FOUR WHEEL DRIVE ELECTRIC VEHICLE

(71) Applicant: Ford Global Technologies, LLC, Dearborn, MI (US)

(72) Inventors: Jason Meyer, Canton, MI (US); Jose Velazquez Alcantar, Canton, MI (US); Rajit Johri, Canton, MI (US); Kevin Ruybal, Canton, MI (US); Dushyant K. Palejiya, Canton, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 16/414,675

(22) Filed: May 16, 2019

(65) Prior Publication Data
US 2020/0361303 A1 Nov. 19, 2020

(51) Int. Cl.
| | |
|---|---|
| *B60W 10/08* | (2006.01) |
| *B60W 20/40* | (2016.01) |
| *B60W 10/02* | (2006.01) |
| *B60K 6/52* | (2007.10) |
| *B60W 20/10* | (2016.01) |
| *F16H 61/04* | (2006.01) |
| *B60K 6/48* | (2007.10) |
| *B60W 30/19* | (2012.01) |
| *B60W 30/182* | (2020.01) |

(52) U.S. Cl.
CPC .............. *B60W 10/08* (2013.01); *B60K 6/52* (2013.01); *B60W 10/02* (2013.01); *B60W 20/10* (2013.01); *B60W 20/40* (2013.01); *B60K 2006/4825* (2013.01); *B60W 30/182* (2013.01); *B60W 30/19* (2013.01); *F16H 2061/0433* (2013.01)

(58) Field of Classification Search
CPC . Y10T 477/26; Y10T 477/32; Y10T 477/328; B60K 2006/4825; B60K 6/52; F16H 2061/0433; B60W 10/02; B60W 10/08; B60W 20/40; B60W 30/182; B60W 30/19; B60W 20/10
See application file for complete search history.

(56) References Cited

U.S. PATENT DOCUMENTS

| | | | | |
|---|---|---|---|---|
| 7,713,164 | B2 * | 5/2010 | Silveri | B60K 6/485 |
| | | | | 477/5 |
| 7,837,593 | B2 * | 11/2010 | Silveri | B60W 10/06 |
| | | | | 477/5 |
| 10,086,836 | B2 | 10/2018 | Doering et al. | |
| 2004/0147365 | A1 * | 7/2004 | Komeda | B60K 6/442 |
| | | | | 477/6 |

(Continued)

FOREIGN PATENT DOCUMENTS

WO 2017136278 A1 8/2017

*Primary Examiner* — Roger L Pang
(74) *Attorney, Agent, or Firm* — David Kelley; McCoy Russell LLP

(57) ABSTRACT

Methods and systems are provided for operating a driveline of a four wheel drive vehicle that includes a high gear ratio and a low gear ratio. The driveline may be operated to shift between the high gear ratio and the low gear ratio while the four wheel drive vehicle is moving. In one example, a clutch is opened during shifting from the high gear ratio to the low gear ratio, which allows the vehicle to continue traveling during the gear ratio change.

6 Claims, 5 Drawing Sheets

(56) References Cited

U.S. PATENT DOCUMENTS

| | | | |
|---|---|---|---|
| 2009/0233757 A1* | 9/2009 | Soliman | B60W 10/10 477/3 |
| 2012/0010041 A1* | 1/2012 | Soliman | B60W 10/02 477/5 |
| 2016/0375890 A1* | 12/2016 | Saito | B60K 6/36 477/5 |
| 2019/0039592 A1* | 2/2019 | Simonini | B60K 1/02 |
| 2019/0368604 A1* | 12/2019 | Sbogard | B60K 1/02 |

* cited by examiner

METHODS AND SYSTEM FOR OPERATING A FOUR WHEEL DRIVE ELECTRIC VEHICLE

FIELD

The present description relates generally to methods and systems for operating a four wheel drive battery electric vehicle. The methods and systems may be particularly useful for electric vehicles that shift between two wheel drive and four wheel drive.

BACKGROUND/SUMMARY

A vehicle may include four wheel drive to improve vehicle traction and handling. The vehicle may operate in two wheel drive by default to conserve energy, but the vehicle may enter four wheel drive during select operating conditions. The vehicle may switch automatically from two wheel drive to four wheel drive when is wheel slip is detected. The vehicle's four wheel drive system may also include a high gear ratio and a low gear ratio. The four wheel drive low gear ratio provides a greater gear ratio reduction as compared to the high gear ratio, and the low gear ratio increases torque amplification from the engine to the vehicle's wheels as compared to the high gear ratio. However, in order to switch from four wheel drive high gear ratio to low gear ratio, the vehicle may have to be stopped. Similarly, to switch from four wheel drive low gear ratio to high gear ratio, the vehicle may have to be stopped. Further, no powertrain torque may be transmitted from the powertrain to the vehicle's wheels during changes from low gear ratio to high gear ratio since the vehicle's wheels may be decoupled from the powertrain torque sources when a change is made from low gear ratio to high gear ratio or vice-versa. Stopping the vehicle to perform gear ratio changes may be inconvenient and it also slows the vehicle's progression, which may not be desirable during some conditions.

The inventors herein have recognized the above-mentioned issues and have developed a driveline operating method, comprising: requesting a change in driveline operating mode while a vehicle is moving; shifting a gearbox to a requested gear in response to the requested change in driveline operating mode while the vehicle is moving; adjusting a rotational speed of an electric machine to a rotational speed of a shaft of the gearbox while the vehicle is moving; and engaging a clutch to couple the electric machine to the shaft of the gearbox.

By shifting a gearbox associated with an axle when a clutch that is between an electric machine and the gearbox is open, it may be possible to continue to propel the vehicle while the gearbox is shifted. Shifting the gearbox on the fly while the vehicle is being propelled allows the vehicle to continue traveling during driveline mode changes. Thus, the vehicle does not have to come to a full stop to change gearbox gear ratios. Further, while the gearbox is being shifted, torque to propel the vehicle may be provided via a second electric machine so that driver demand torque may be met even while the driveline is undergoing the shift.

The present description may provide several advantages. In particular, the approach may improve driver satisfaction since an operating mode of a driveline may be changed without having to fully stop motion of a vehicle before changing driveline operating modes. Further, the approach may improve vehicle drivability in off-road conditions by allowing the driveline to switch operating modes based on driving conditions without driver input. In addition, the approach may improve vehicle drivability by allowing driver demand torque to be met while a driveline mode change is in progress.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
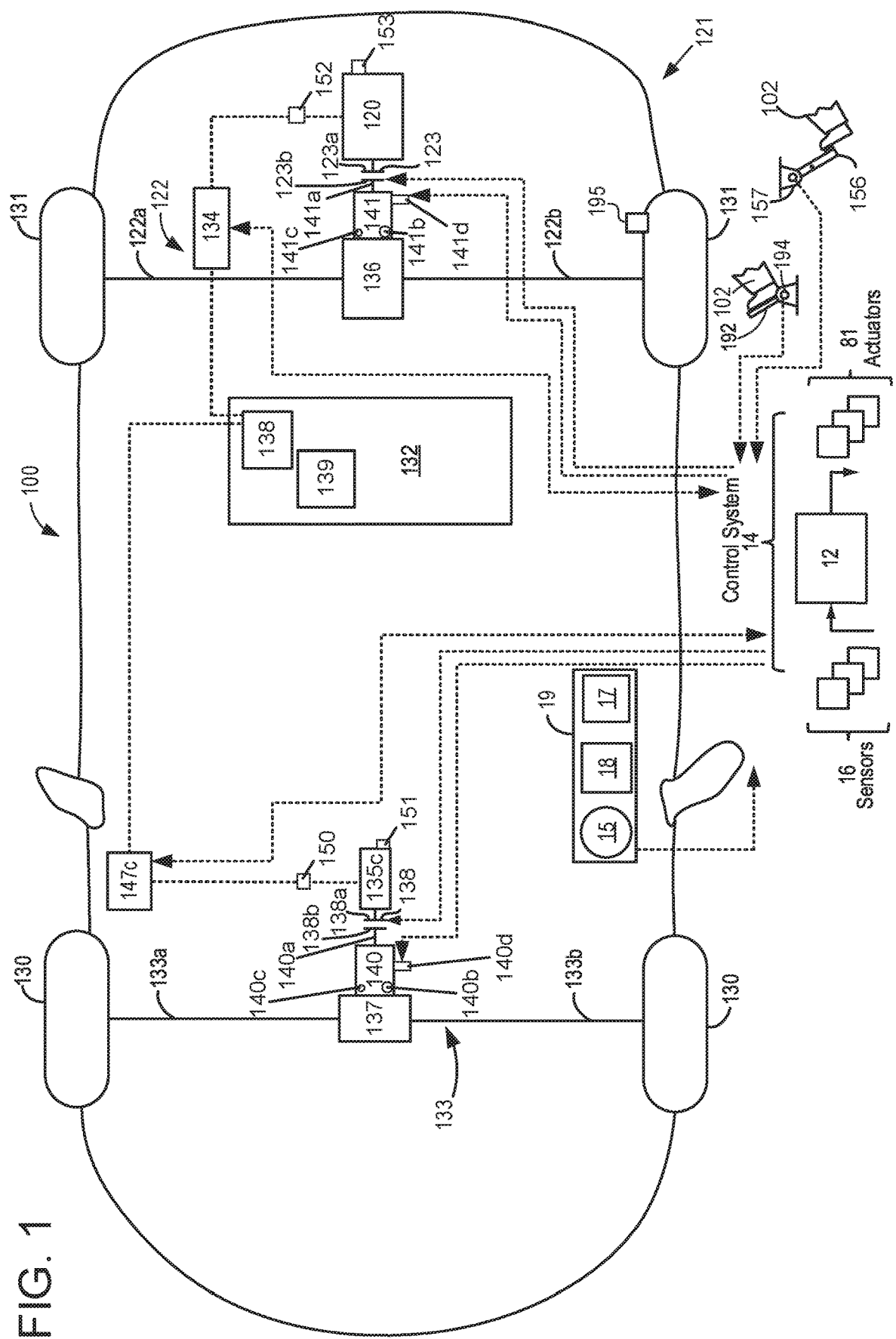
FIG. 1 is a schematic diagram of a hybrid vehicle driveline.

The following description relates to systems and methods for operating a driveline of a battery electric vehicle (BEV). FIG. 1 shows an example vehicle driveline or powertrain system that includes two electric machines, two driveline disconnect clutches, and two gearboxes. The driveline may be operated according to the method of FIG. 2. The driveline of FIG. 1 may be operated according to the method of FIG. 2 to provide the vehicle operating sequences shown in FIGS. 3-5.

FIG. 1 illustrates an example vehicle propulsion system 100 for vehicle 121. Vehicle propulsion system 100 includes at two propulsion power sources including first electric machine 135*c* and second electric machine 120. Electric machines 120 and 135*c* consume electrical energy to produce an electric machine output power or torque. As such, a vehicle with propulsion system 100 may be referred to as an electric vehicle. Throughout the description of FIG. 1, mechanical connections between various components are illustrated as solid lines, whereas electrical connections between various components are illustrated as dashed lines.

Vehicle propulsion system 100 has a front axle 133 and a rear axle 122. The front axle 133 may be referred to as a secondary axle and rear axle 122 may be referred to as a primary axle, or vice-versa. In some examples, rear axle 122 may comprise two half shafts, for example first half shaft 122*a*, and second half shaft 122*b*. Likewise, front axle 133 may comprise two half shafts, for example first half shaft 133*a* and second half shaft 133*b*. Vehicle propulsion system 100 further has front wheels 130 and rear wheels 131. In this example, front wheels 130 may be driven via first electric machine 135*c* and rear wheels 131 may be driven electrically via second electric machine 120.

The first electric machine 135*c* may be selectively mechanically coupled to the front axle 133 via first driveline disconnect clutch 138. First driveline disconnect clutch 138 may be electrically or hydraulically opened and closed via controller 12. First electric machine 135*c* is coupled to an input side 138*a* of first driveline disconnect clutch 138, and a second side 138*b* of first driveline disconnect clutch is mechanically coupled to shaft 140*a* of first gearbox 140. It should be noted that the gearbox input is not limited to a shaft, rather the first gearbox 140 may be coupled to driveline disconnect clutch in any known way including, but not limited to a yoke, receiver, hub, or other known device. First gearbox 140 may include a first low gear 140b and a second high gear 140c. Controller 12 may change gears via gear selector actuator 140d. First gearbox 140 is mechanically coupled to differential gears 137, which may be referred to as a differential. Differential gears 137 are mechanically coupled to wheels 130 via first half shaft 133a and second half shaft 133b.

The second electric machine 120 may be selectively mechanically coupled to the rear axle 122 via second driveline disconnect clutch 123. Second driveline disconnect clutch 123 may be electrically or hydraulically opened and closed via controller 12. Second electric machine 120 is coupled to an input side 123a of second driveline disconnect clutch 123, and a second side 123b of second driveline disconnect clutch 123 is mechanically coupled to shaft 141a of second gearbox 141. It should be noted that the second gearbox 141 input is not limited to a shaft, rather the second gearbox 141 may be coupled to driveline disconnect clutch in any known way including, but not limited to a yoke, receiver, hub, or other known device. Second gearbox 141 may include a first low gear 141b and a second high gear 141c. Controller 12 may change gears via gear selector actuator 141d. Second gearbox 141 is mechanically coupled to differential gears 136, which may be referred to as a differential. Differential gears 136 are mechanically coupled to wheels 131 via first half shaft 122a and second half shaft 122b.

The rear axle 122 may be powered via electric machine 120 and front axle 133 may not be powered via first electric machine 135c when vehicle 121 is operated in a two wheel drive mode. Alternatively, the front axle 133 may be powered via first electric machine 135c and rear axle 122 may not be powered via second electric machine 120 when vehicle 121 is operated in a two wheel drive mode. The rear axle 122 may be power via second electric machine 120 and front axle 133 may be powered via first electric machine 135c when vehicle 121 is operated in a four wheel drive mode.

Electric machines 120 and 135c may receive electrical power from onboard electrical energy storage device 132. Furthermore, electric machine 120 and electric machine 135c may provide a generator function to convert the vehicle's kinetic energy into electrical energy, where the electrical energy may be stored at electric energy storage device 132 for later use by the second electric machine 120 or the first electric machine 135c. A second inverter system controller (ISC1) 134 may convert alternating current generated by second electric machine 120 to direct current for storage at the electric energy storage device 132 and vice versa. First inverter (ISC2) 147c may convert alternating current generated by first electric machine 135c to direct current for storage at the electric energy storage device 132 or provide alternating current to first electric machine 135c to propel vehicle 121. Current sensors 150 and 152 may sense electric current flowing to and from first electric machine 135c and second electric machine 120. Further, temperature sensors 151 and 153 may sense temperatures of first electric machine 135c and second electric machine 120. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of second inverter 134, second electric machine 120, first inverter 147c, first electric machine 135c, energy storage device 132, etc. Control system 14 may receive sensory feedback information from one or more of second electric machine 120, second inverter 134, energy storage device 132, first electric machine 135c, first inverter 147c, etc. Further, control system 14 may send control signals to one or more of second electric machine 120, second inverter 134, first electric machine 135c, first inverter 147c, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include wheel speed sensor(s) 195, current sensors 150 and 152, temperature sensors 151 and 153, etc. Further, actuators may include first inverter 147c, first electric machine 135c, second inverter 134, and second electric machine 120.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. For example, a human may request two wheel drive mode, four wheel drive first low gear ratio, or four wheel drive second high gear ratio via display system 18. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., first electric machine 135c and second electric machine 120) based on a human operator input. Various examples of the operator starter interface 15 may include interfaces that require a physical apparatus, such as an active key, that may be inserted into the operator starter interface 15 to start the first electric machine 135c and/or the second electric machine 120, or may be removed to shut down the first electric machine 135c or the second electric machine 120 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle electric propulsion machines. Rather, the passive key may need to be located inside or proximate to the vehicle (e.g., within a threshold distance of the vehicle). Still other examples may additionally or optionally use a start/stop button that is manually pressed by the operator to start or shut down the first electric machine 135c and the second electric machine 120, thereby turning the vehicle on or off.

Thus, the system of FIG. 1 provides for a driveline system, comprising: a first electric machine coupled to a first gearbox and selectively coupled to a first axle via a first clutch; a second electric machine coupled to a second gearbox and selectively coupled to a second axle via a second clutch; and a controller including executable instructions stored in non-transitory memory to shift the first gearbox from a first gear ratio to a second gear ratio in response to a request to change a driveline operating mode while the second electric machine is propelling a vehicle. The system further comprises additional executable instructions stored in non-transitory memory to shift the second gearbox in response to the request to change the driveline operating mode while the first electric machine is propelling the vehicle. The system further comprises additional executable instructions stored in non-transitory memory to decouple the first electric machine from the first axle in response to the request to change the driveline operating mode. The system further comprises additional executable instructions stored in non-transitory memory to decouple the second electric machine from the second axle in response to the request to change the driveline operating mode. The system includes where the first electric machine is decoupled from the first axle when the second electric machine is coupled to the second axle. The system includes where the second electric machine is decoupled from the second axle when the first electric machine is coupled to the first axle.

Figure 2:
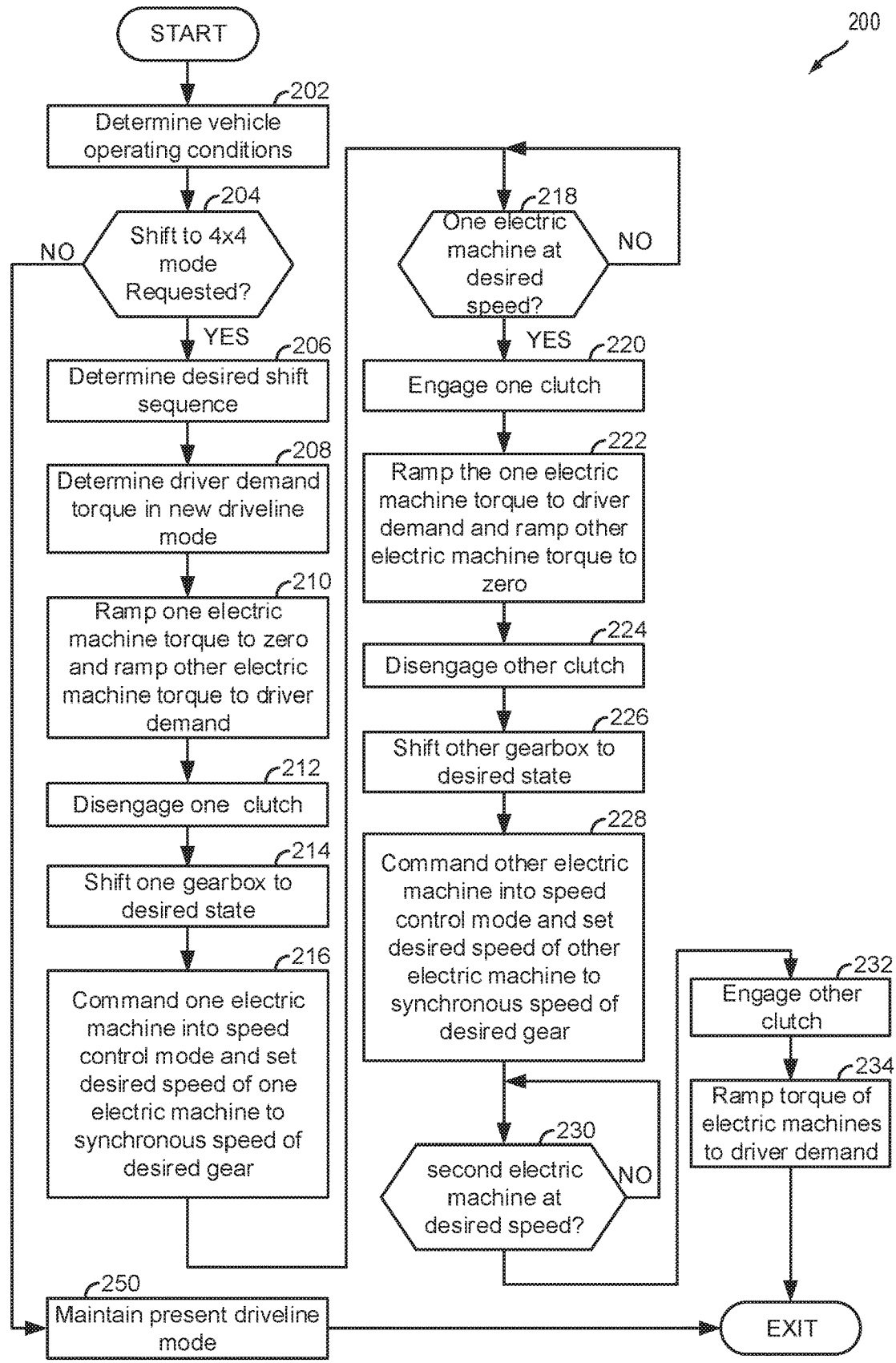
FIG. 2 is a flowchart of an example method for operating a driveline.

Referring now to FIG. 2, an example method for operating an electric vehicle driveline to improve driveline efficiency and vehicle drivability is shown. The method of FIG. 2 may be incorporated into and may cooperate with the system of FIG. 1. Further, at least portions of the method of FIG. 2 may be incorporated as executable instructions stored in non-transitory memory while other portions of the method may be performed via a controller transforming operating states of devices and actuators in the physical world. The method of FIG. 2 may be executed or performed while the vehicle is activated and being propelled via at least one of first electric machine 135c and second electric machine 120.

At 202, method 200 determines vehicle operating conditions. Vehicle operating conditions may include, but are not limited to requested driveline operating mode (e.g., two wheel drive, four wheel drive first low gear ratio, or four wheel drive second high gear ratio), battery state of charge, electric machine temperatures, current flow to or from the electric machines, and ambient environmental conditions. Method 200 proceeds to 204.

At 204, method 200 judges if there is a request to shift from two wheel drive mode into a four wheel drive mode or if there is a request to change from a first four wheel drive mode to a second four wheel drive mode, which may be referred to as a driveline mode change. In two wheel drive mode, power may be provided to rear wheels 131 via second electric machine 120 while front wheels 130 are not driven via first electric machine 135c. Alternatively in two wheel drive mode, power may be provided to front wheels 130 via first electric machine 135c while rear wheels 131 are not driven via second electric machine 120. In a first four wheel drive mode, gearboxes 140 and 141 are shifted into first gear ratios (e.g., low range) while first electric machine 135c supplies power to front wheels 130 and second electric machine 120 supplies power to rear wheels 131. In a second four wheel drive mode, gearboxes 140 and 141 are shifted into second gear ratios (e.g., high range) while first electric machine 135c supplies power to front wheels 130 and second electric machine 120 supplies power to rear wheels 131. The first gear ratio of gearboxes 140 and 141 provides greater amplification of electric machine torque than the second gear ratio of gear boxes 140 and 141. Thus, the first gear ratio of gearboxes 140 and 141 may be more suitable for low speed vehicle operation and vehicle speed may be limited to less than a threshold speed (e.g., 15 kilometers/hour) when gearboxes 140 and 141 are engaged in their respective first gear ratios. A human driver or autonomous driver may request a driveline mode change via a human/machine interface or via a controller to controller request. If method 200 judges that there is a driveline mode change request, the answer is yes and method 200 proceeds to 206. Otherwise, the answer is no and method 200 proceeds to 250.

At 250, method 200 maintains the presently selected driveline operating mode. For example, method 200 may allow the driveline to remain in two wheel drive mode. Method 200 proceeds to exit.

At 206, method 200 determines a desired shift sequence for the driveline to change operating modes. Method 200 may select the driveline mode change to begin by first changing the operation of the front axle and then end by changing operation of the rear axle. Alternatively, method 200 may select the driveline mode change to begin by first changing the operation of the rear axle and then end by changing operation of the front axle. Method 200 may determine the desired shift sequence based on the vehicle type, driving conditions, vehicle location, or other vehicle operating conditions. For example, method 200 may select first changing the operation of the front axle and then end by changing operation of the rear axle when the rear wheel slip is detected and the driveline mode is changing from four wheel second or high gear ratio to four wheel drive low gear ratio so that the front wheels may be first exposed to greater torque amounts to maintain vehicle motion during wheel slip conditions. Alternatively, method 200 may select first changing the operation of the rear axle and then end by changing operation of the front axle when the front wheel slip is detected and the driveline mode is changing from four wheel second or high gear ratio to four wheel drive low gear ratio so that the rear wheels may be first exposed to greater torque amounts to maintain vehicle motion during wheel slip conditions. In one example, the desired shifting sequence may be determined via logic or state variables and predetermined driveline shifting sequences that are stored in controller memory.

In still other examples, the desired shift sequence for the driveline to change operating modes may be based on the torque capacities (e.g., maximum threshold or rated amounts of positive and regenerative torques that an electric machine may produce) of the first and second electric machines. For example, if the first electric machine has a greater torque capacity than the second electric machine and the driveline mode change includes a change from a lower gear ratio of a gearbox to a higher gear ratio of the gearbox, then the second gearbox that is associated with the second electric machine is shifted in the sequence before the first gearbox. On the other hand, if the first electric machine has a greater torque capacity than the second electric machine and the driveline mode change includes a change from the higher gear ratio of a gearbox to a lower gear ratio of the gearbox, then the first gearbox that is associated with the first electric machine is shifted in the sequence before the second gearbox. If the electric machines have equal torque capacity, then the gearbox of the axle with the lowest normal force applied to it is shifted first in the sequence. Method 200 proceeds to 208 after the desired driveline shift sequence is determined.

At 208, method 200 determines a driver demand wheel torque in the newly selected driveline operating mode. In one example, method 200 determines the driver demand wheel torque in the newly selected driveline operating mode via the selected driveline operating mode, accelerator pedal position, and present vehicle speed. In particular, a table or function that is associated with the selected driveline operating mode (e.g., two wheel drive, four wheel drive high gear ratio, four wheel drivel low gear ratio) is referenced or indexed via present accelerator pedal position and vehicle speed. The table or function outputs the driver demand wheel torque for the selected driveline operating mode. The values in the table or function may be empirically determined and based on the particular attributes of the selected driveline operating mode.

For example, a particular accelerator pedal position at a particular vehicle speed may result in a first driver demand wheel torque when the vehicle is requesting four wheel drive mode in the high gear ratio and accessing a table or function that holds values for operating the vehicle in the four wheel drive mode high gear ratio. However, the same particular accelerator pedal position at the same particular vehicle speed may result in a second driver demand wheel torque when the vehicle is requesting four wheel drive mode in the low gear ratio and accessing a table or function that holds values for operating the vehicle in the four wheel drive mode low gear ratio, where the second driver demand wheel torque is lower than the first driver demand wheel torque.

In other examples, tables or functions for different driveline operating modes may output same driver demand wheel torques for a particular accelerator pedal position and vehicle speed. Specifically, a particular accelerator pedal position at a particular vehicle speed may result in a first driver demand wheel torque when the vehicle is requesting four wheel drive mode in the high gear ratio and accessing a table or function that holds values for operating the vehicle in the four wheel drive mode high gear ratio. Similarly, the same particular accelerator pedal position at the same particular vehicle speed may result in the first driver demand wheel torque when the vehicle is requesting four wheel drive mode in the low gear ratio and accessing a table or function that holds values for operating the vehicle in the four wheel drive mode low gear ratio. Thus, depending on the application and vehicle operating conditions the driver demand wheel torque may be determined in different or same ways. Method 200 proceeds to 210 after driver demand wheel torque is determined.

At 210, method 200 adjusts one electric machine torque output to zero and adjusts torque output of the other electric machine to provide the requested driver demand torque. For example, if method 200 judges that the driveline mode change will begin at the front axle and end at the rear axle, then torque of electric machine 135c is gradually reduced to zero and torque output of electric machine 120 is increased so that the driver demand wheel torque is delivered to the rear wheels 131. On the other hand, if method 200 judges that the driveline mode change will begin at the rear axle and end at the front axle, then torque of electric machine 120 is gradually reduced to zero and torque output of electric machine 135c is increased so that the driver demand wheel torque is delivered to the front wheels 130. Method 200 proceeds to 212.

At 212, method 200 fully opens or disengages one clutch. For example, if method 200 judges that the driveline mode change will begin at the front axle and end at the rear axle, then driveline disconnect clutch 138 is fully opened. On the other hand, if method 200 judges that the driveline mode change will begin at the rear axle and end at the front axle, then driveline disconnect clutch 123 is fully opened. By opening the one driveline disconnect clutch, one of the electric machines may be decoupled from the driveline to allow one gearbox to be shifted. The driveline disconnect clutch that is not opened is in a closed state. Method 200 proceeds to 214.

At 214, method 200 shifts one gearbox to the requested or desired state. For example, if method 200 judges that the driveline mode change will begin at the front axle and end at the rear axle, then gearbox 140 is shifted to a first low gear or a second high gear according to the requested driveline operating mode. Conversely, if method 200 judges that the driveline mode change will begin at the rear axle and end at the front axle, then gearbox 141 is shifted to a first low gear or a second high gear according to the requested driveline operating mode. Method 200 proceeds to 216.

At 216, method 200 commands one electric machine into speed control mode and adjusts a desired or requested rotational speed of the one electric machine to a rotational speed of the shaft of the one gearbox, where the rotational speed of the shaft is dependent on the selected gear of the one gearbox. Speed control mode is a mode of the one electric machine where torque of the one electric machine is adjusted so that the rotational speed of the one electric machine matches a requested speed of the one electric machine. For example, if method 200 judges that the driveline mode change will begin at the front axle and end at the rear axle, then electric machine 135c commanded into a speed control mode and the rotational speed of electric machine 135c is adjusted to a rotational speed of shaft 140a, the speed of shaft 140a is a function of the engaged gear of gearbox 140. Alternatively, if method 200 judges that the driveline mode change will begin at the rear axle and end at the front axle, then electric machine 120 commanded into a speed control mode and the rotational speed of electric machine 120 is adjusted to a rotational speed of shaft 141a, the speed of shaft 141*a* is a function of the engaged gear of gearbox 141. Method 200 proceeds to 218.

At 218, method 200 judges if the rotational speed of the one electric machine is within a threshold speed of the desired or requested rotational speed (e.g., at the rotational speed of the gearbox shaft). For example, if the driveline mode change begins at the front axle and ends at the rear axle, then method 200 judges if the rotational speed of electric machine 135*c* is within a threshold speed of the rotational speed of shaft 140*a*. Alternatively, if the driveline mode change begins at the rear axle and ends at the front axle, then method 200 judges if the rotational speed of electric machine 120 is within a threshold speed of the rotational speed of shaft 141*a*. If method 200 judges that the rotational speed of the one electric machine is within a threshold speed of the desired or requested rotational speed, then the answer is yes and method 200 proceeds to 220. Otherwise, the answer is no and method 200 returns to 218.

At 220, method 200 engages the one clutch that is associated with the one electric machine. For example, if the driveline mode change begins at the front axle and end at the rear axle, then method 200 engages clutch 138. Alternatively, if the driveline mode change begins at the rear axle and ends at the front axle, then method 200 engages clutch 123. Method 200 proceeds to 222.

At 222, method 200 adjusts the other electric machine torque output to zero and adjusts torque output of the one electric machine to provide the requested driver demand torque. For example, if method 200 judges that the driveline mode change will begin at the front axle and end at the rear axle, then torque of electric machine 120 is gradually reduced to zero and torque output of electric machine 135*c* is increased so that the driver demand wheel torque is delivered to the front wheels 130. On the other hand, if method 200 judges that the driveline mode change will begin at the rear axle and end at the front axle, then torque of electric machine 135*c* is gradually reduced to zero and torque output of electric machine 120 is increased so that the driver demand wheel torque is delivered to the rear wheels 131. Method 200 proceeds to 224.

At 224, method 200 fully opens or disengages the other clutch. For example, if method 200 judges that the driveline mode change will begin at the front axle and end at the rear axle, then driveline disconnect clutch 123 is fully opened. On the other hand, if method 200 judges that the driveline mode change will begin at the rear axle and end at the front axle, then driveline disconnect clutch 138 is fully opened. By opening the other driveline disconnect clutch, the other of the electric machines may be decoupled from the driveline to allow the other gearbox to be shifted. Method 200 proceeds to 226.

At 226, method 200 shifts the other gearbox to the requested or desired state. For example, if method 200 judges that the driveline mode change will begin at the front axle and end at the rear axle, then gearbox 141 is shifted to a first low gear or a second high gear according to the requested driveline operating mode. Conversely, if method 200 judges that the driveline mode change will begin at the rear axle and end at the front axle, then gearbox 140 is shifted to a first low gear or a second high gear according to the requested driveline operating mode. Method 200 proceeds to 228.

At 228, method 200 commands the other electric machine into speed control mode and adjusts a desired or requested rotational speed of the other electric machine to a rotational speed of the shaft of the other gearbox, where the rotational speed of the shaft is dependent on the selected gear of the other gearbox. For example, if method 200 judges that the driveline mode change will begin at the front axle and end at the rear axle, then electric machine 120 commanded into a speed control mode and the rotational speed of electric machine 120 is adjusted to a rotational speed of shaft 141*a*, the speed of shaft 141*a* is a function of the engaged gear of gearbox 141. Alternatively, if method 200 judges that the driveline mode change will begin at the rear axle and end at the front axle, then electric machine 135*c* commanded into a speed control mode and the rotational speed of electric machine 135*c* is adjusted to a rotational speed of shaft 140*a*, the speed of shaft 140*a* is a function of the engaged gear of gearbox 140. Method 200 proceeds to 230.

At 230, method 200 judges if the rotational speed of the other electric machine is within a threshold speed of the desired or requested rotational speed (e.g., at the rotational speed of the other gearbox shaft). For example, if the driveline mode change begins at the front axle and ends at the rear axle, then method 200 judges if the rotational speed of electric machine 120 is within a threshold speed of the rotational speed of shaft 141*a*. Alternatively, if the driveline mode change begins at the rear axle and ends at the front axle, then method 200 judges if the rotational speed of electric machine 135*c* is within a threshold speed of the rotational speed of shaft 140*a*. If method 200 judges that the rotational speed of the other electric machine is within a threshold speed of the desired or requested rotational speed, then the answer is yes and method 200 proceeds to 232. Otherwise, the answer is no and method 200 returns to 230.

At 230, method 200 engages the other clutch that is associated with the other electric machine. For example, if the driveline mode change begins at the front axle and end at the rear axle, then method 200 engages clutch 123. Alternatively, if the driveline mode change begins at the rear axle and ends at the front axle, then method 200 engages clutch 138. Method 200 proceeds to 234.

At 234, method 200 adjust torque output of the electric machines (e.g., 120 and 135*c*) to provide the requested driver demand wheel torque. The driver demand wheel torque may be split in a 50:50 ratio between the front and rear wheels. Alternatively, the wheel torque split may be provided in a ratio that is other than 50:50. Method 200 proceeds to exit.

In this way, operation of a vehicle driveline may be sequenced so that a vehicle may continue to move while shifting between driveline operating modes. Further, the vehicle may smoothly provide the desired driver demand torque while the driveline mode change is being completed.

Thus, the method of FIG. 2 provides for a driveline operating method, comprising: requesting a change in driveline operating mode while a vehicle is moving; shifting a gearbox to a requested gear in response to the requested change in driveline operating mode while the vehicle is moving; adjusting a rotational speed of an electric machine to a rotational speed of a shaft of the gearbox while the vehicle is moving; and engaging a clutch to couple the electric machine to the shaft of the gearbox. The method includes where the change in driveline operating mode changes a vehicle driveline from operating in a four wheel drive high ratio to operating in a four wheel drive low ratio. The method includes where the change in driveline operating mode changes a vehicle driveline from operating in a four wheel drive low ratio to operating in a four wheel drive high ratio. The method further comprises opening the clutch in response to the requested change in driveline operating mode, the clutch opened before shifting the gearbox into the requested gear. The method includes where the clutch is positioned between the electric machine and the gearbox. The method further comprises operating the electric machine in a speed control mode when adjusting the speed of the electric machine. The method includes where the requested gear is a lowest gear ratio of the gearbox.

The method of FIG. 2 provides for a driveline operating method, comprising: requesting a change in driveline operating mode while a vehicle is moving; shifting a first gearbox to a requested gear in response to the requested change in driveline operating mode while the vehicle is moving and a second gearbox is engaged in a gear; adjusting rotational speed of a first electric machine to a rotational speed of a shaft of the gearbox while the vehicle is propelled via a second electric machine that is coupled to the second gearbox; and engaging a first clutch to couple the first electric machine to the shaft of the gearbox. The method includes where the first gearbox is coupled to a first axle, and where the second gearbox is coupled to a second axle. The method further comprises opening the first clutch before shifting the first gearbox to the requested gear. The method further comprises adjusting a torque of the first electric machine to zero while operating the first electric machine in a torque control mode in response to the requested change in driveline operating mode and before opening the first clutch. The method further comprises operating the first electric machine in a torque control mode in response to the first clutch being engaged. The method further comprises adjusting a torque of the second electric machine to zero while operating the second electric machine in a torque control mode in response to the first clutch being engaged. The method further comprises disengaging a second clutch in response to the torque of the second electric machine being zero.

In another representation, the method of FIG. 2 provides for The method of FIG. 2 provides for a driveline operating method, comprising: requesting a change in driveline operating mode while a vehicle is moving; shifting a first gearbox to a requested gear in response to the requested change in driveline operating mode while the vehicle is moving and a second gearbox is engaged in a gear, the first gearbox selectively coupled to a first electric machine, the first electric machine having a torque producing capacity that is different from a torque producing capacity of a second electric machine, the first and second electric machines selectively providing propulsion torque for a vehicle. The method includes where the torque capacity of the first electric machine is less than the torque capacity of the second electric machine. The method includes where the torque capacity of the first electric machine is greater than the torque capacity of the second electric machine. The method includes where the first gearbox is shifted before the second gearbox in response to the requested change in driveline operating mode. The method includes where the first gearbox is shifted after the second gearbox in response to the requested change in driveline operating mode.

Figure 3:
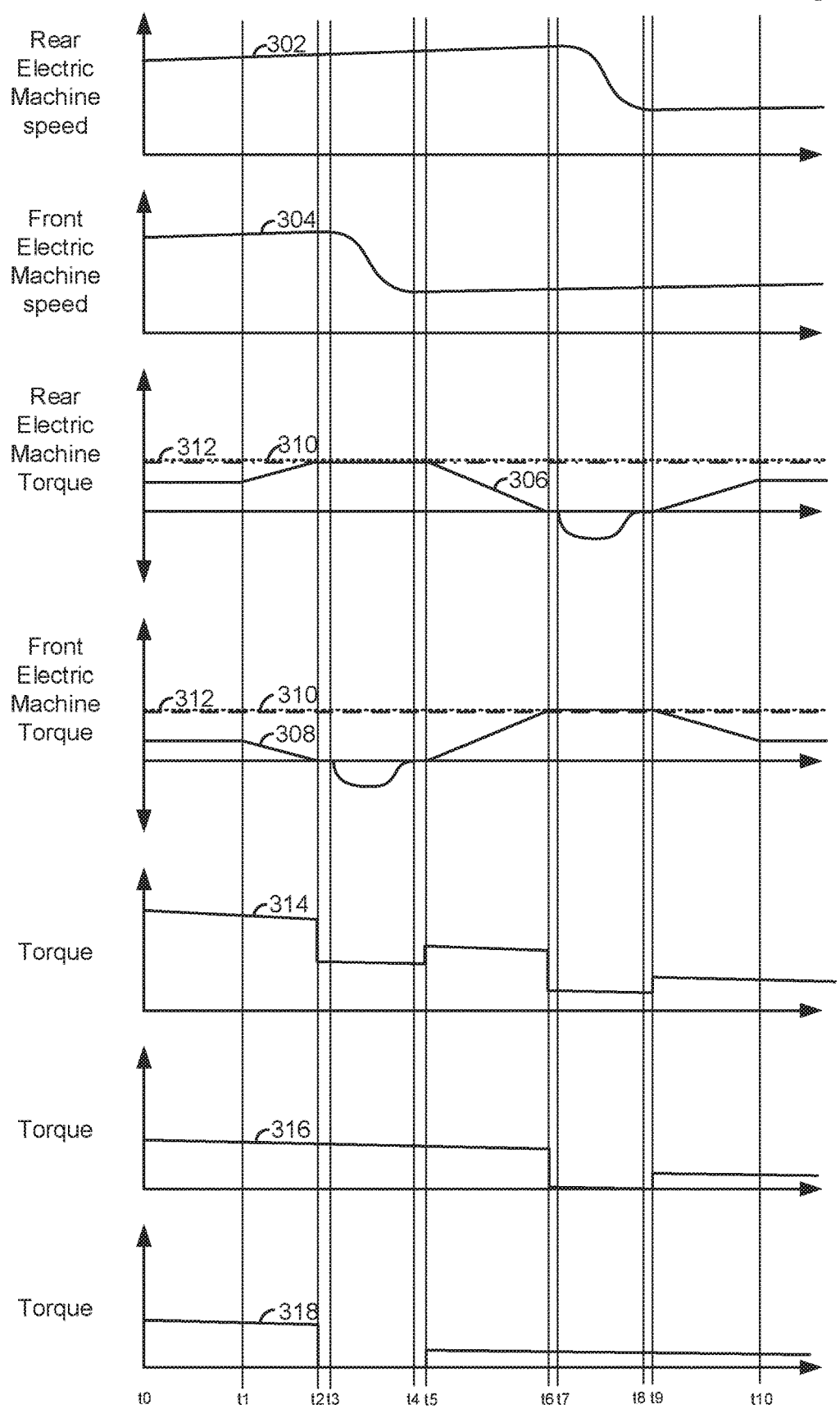
FIGS. 3-5 show example driveline operating sequences according to the method of FIG. 2.

Referring now to FIG. 3, a prophetic operating sequence according to the method of FIG. 2 is shown. The vehicle operating sequence shown in FIG. 3 may be provided via the method of FIG. 2 in cooperation with the system shown in FIG. 1. The plots shown in FIG. 3 occur at the same time and are aligned in time. Vertical lines t0-t10 represent times of interest in the sequence. The sequence of FIG. 3 is performed while a vehicle is in motion and traveling without stopping the vehicle.

The first plot from the top of FIG. 3 is a plot of rear electric machine speed versus time. The vertical axis represents the rotational speed of the rear electric machine (e.g., 120) and the rotational speed of the rear electric machine increases in the direction of the vertical axis arrow. The horizontal axis represents time and time increases from the left side of the figure to the right side of the figure. Trace 302 represents the rotational speed of the rear electric machine.

The second plot from the top of FIG. 3 is a plot of front electric machine speed versus time. The vertical axis represents the rotational speed of the front electric machine (e.g., 135c) and the rotational speed of the front electric machine increases in the direction of the vertical axis arrow. The horizontal axis represents time and time increases from the left side of the figure to the right side of the figure. Trace 304 represents the rotational speed of the front electric machine.

The third plot from the top of FIG. 3 is a plot of rear electric machine torque versus time. The vertical axis represents the torque of the rear electric machine (e.g., 120) and the torque of the rear electric machine increases in the direction of the vertical axis arrow. The horizontal axis represents time and time increases from the left side of the figure to the right side of the figure. Trace 306 represents the torque of the rear electric machine. Dashed line trace 312 represents driver demand wheel torque as reflected at the rear electric machine based on accelerator pedal position when the axle gearboxes (e.g., 140 and 141) are engaged in their respective second high gear ratios. Dashed-dot trace 310 represents driver demand wheel torque as reflected at the rear electric machine based on accelerator pedal position when the axle gearboxes (e.g., 140 and 141) are engaged in their respective first lower gear ratios. Thus, in this example, the driver demand torques are the same whether the vehicle driveline is in four wheel drive high gear ratio or low gear ratio (the separation between lines 320 and 322 is shown so that the lines are visible).

The fourth plot from the top of FIG. 3 is a plot of front electric machine torque versus time. The vertical axis represents the torque of the front electric machine (e.g., 135c) and the torque of the front electric machine increases in the direction of the vertical axis arrow. The horizontal axis represents time and time increases from the left side of the figure to the right side of the figure. Trace 308 represents the torque of the front electric machine. Dashed line trace 312 represents driver demand wheel torque as reflected at the front electric machine based on accelerator pedal position when the axle gearboxes (e.g., 140 and 141) are engaged in their respective second high gear ratios (this is the same level shown in the third plot from the top of FIG. 3). Dashed-dot trace 310 represents driver demand wheel torque as reflected at the front electric machine based on accelerator pedal position when the axle gearboxes (e.g., 140 and 141) are engaged in their respective first lower gear ratios (this is the same level shown in the third plot from the top of FIG. 3).

The fifth plot from the top of FIG. 3 is a plot of a total amount of torque that may be generated via the front and rear electric machines and that is available at the wheels versus time. The vertical axis represents the total amount of torque that is available at the wheels and the total amount of torque that is available at the wheels increases in the direction of the vertical axis arrow. The horizontal axis represents time and time increases from the left side of the figure to the right side of the figure. Trace 314 represents a total amount of torque that is available at the wheels.

The sixth plot from the top of FIG. 3 a plot of a total amount of torque that may be generated by the rear electric machine and that is available at the rear wheels versus time. The vertical axis represents the total amount of torque generated by the rear electric machine that is available at the rear wheels and the total amount of torque generated by the rear electric machine (e.g., 120) that is available at the rear wheels increases in the direction of the vertical axis arrow. The horizontal axis represents time and time increases from the left side of the figure to the right side of the figure. Trace 316 represents a total amount of torque that may be generated by the rear electric machine that is available at the rear wheels.

The seventh plot from the top of FIG. 3 a plot of a total amount of torque generated by the front electric machine that is available at the front wheels versus time. The vertical axis represents the total amount of torque generated by the front electric machine (e.g., 135c) that is available at the front wheels and the total amount of torque generated by the front electric machine that is available at the front wheels increases in the direction of the vertical axis arrow. The horizontal axis represents time and time increases from the left side of the figure to the right side of the figure. Trace 318 represents a total amount of torque that is available at the front wheels.

The horizontal axis of each plot corresponds to a value of zero for the vertical axis unless otherwise noted. Further, the vertical axis of each plot corresponds to a value of zero time.

At time t0, the rotational speeds of the front and rear electric machines are equal. Further, the torque of the front and rear electric machines is equal and the reflected driver demand torques for the low and high gear ratios are equal. The driveline is in four wheel drive low gear ratio (not shown) and the total available wheel torque is at a high level. The available front wheel torque generated by the front electric machine and the available rear wheel torque generated by the rear electric machine are at high levels.

At time t1, a driveline mode change request is made to shift the driveline from four wheel drive first lower gear ratio to a four wheel drive second higher gear ratio. The front electric machine torque output is decreased and the rear electric machine torque is increased in response to the request. The speeds of the electric machines increase a small amount and the total available torque is reduced a small amount as the speeds of the electric machines increase. The available torques of the front and rear electric machines also decline as the speeds of the electric machines increase.

At time t2, the driveline disconnect clutch of the front axle (e.g., 138) is requested open so that the front axle gearbox ratio may be changed to the higher gear ratio in response to the front electric machine torque reaching zero and the rear electric machine torque meeting driver demanded wheel torque. The total amount of torque that may be available to the wheels is reduced as the driveline disconnect clutch of the front axle is commanded open. The total amount of torque that may be generated by the front electric machine and that is available to the front wheels is reduced to zero as the disconnect clutch of the front axle is commanded open. The total amount of torque that may be generated by the rear electric machine and that is available to the rear wheels is reduced a small amount as speeds of the front and rear wheels increase a small amount.

At time t3, the driveline disconnect clutch of the front axle (e.g., 138) is fully open and the front axle gearbox ratio is commanded to the higher gear ratio (not shown). The speed of the front electric machine begins to decrease in response to the front electric machine torque reaching zero and the front axle being shifted to the higher gear ratio. The total amount of torque that may be available to the wheels remains close to its previous level as do the total amounts of torque that may be generated by the front electric machine and the rear electric machine and that is available at the wheels.

At time t4, the driveline disconnect clutch of the front axle (e.g., 138) is requested closed in response to the front gearbox shift being complete. The total amount of torque that may be available to the wheels remains unchanged. The total amount of torque that may be generated by the front electric machine and that is available to the front wheels is also unchanged. The total amount of torque that may be generated by the rear electric machine and that is available to the rear wheels is unchanged. The front electric machine torque is zero and the rear electric machine torque is providing the driver demand torque at the vehicle wheels. The speed of the front axle electric machine is a lower speed and the speed of the rear axle electric machine is a higher speed.

At time t5, the driveline disconnect clutch of the front axle (e.g., 138) is fully closed and the front axle electric machine is commanded to provide the driver demand torque at the wheels. Further, the rear axle electric machine is commanded to zero torque. The speeds of the front and rear electric machines continue at their respective previous levels. The total amount of torque that may be available to the wheels increases because both the front electric machine and the rear electric machine may supply torque to their respective axles, but the total that is available is less than at time t0 because the front gearbox is now engaged in the second higher gear ratio. The total amount of torque generated by the front electric machine that is available at the front wheels is lower than at time t0 since the front gearbox is engaged in the second higher gear ratio. The total amount of torque generated by the rear electric machine that is available at the rear wheels remains near its previous level since the rear gearbox is still engaged in the first lower gear ratio.

At time t6, the driveline disconnect clutch of the rear axle (e.g., 123) is requested open so that the rear axle gearbox ratio may be changed to the higher gear ratio in response to the rear electric machine torque reaching zero and the front electric machine torque meeting driver demanded wheel torque. The total amount of torque that may be available to the wheels is reduced again as the driveline disconnect clutch of the rear axle is commanded open. The total amount of torque that may be generated by the rear electric machine and that is available to the rear wheels is reduced to zero as the disconnect clutch of the rear axle is commanded open. The total amount of torque that may be generated by the front electric machine and that is available to the front wheels is near its previous level.

At time t7, the driveline disconnect clutch of the rear axle (e.g., 123) is fully open and the rear axle gearbox ratio is commanded to the higher gear ratio (not shown). The speed of the rear electric machine begins to decrease in response to the rear electric machine torque reaching zero and the rear axle being shifted to the higher gear ratio. The total amount of torque that may be available to the wheels remains close to its previous level as do the total amounts of torque that may be generated by the front electric machine and the rear electric machine and that is available at the wheels.

At time t8, the driveline disconnect clutch of the rear axle (e.g., 123) is requested closed in response to the rear gearbox shift being complete. The total amount of torque that may be available to the wheels remains unchanged. The total amount of torque that may be generated by the front electric machine and that is available to the front wheels is also unchanged. The total amount of torque that may be generated by the rear electric machine and that is available to the rear wheels is unchanged. The rear electric machine torque is zero and the front electric machine torque is providing the driver demand torque at the vehicle wheels. The speed of the rear axle electric machine is at the speed of the front axle electric machine.

At time t9, the driveline disconnect clutch of the rear axle (e.g., 123) is fully closed and the rear axle electric machine is commanded to provide a portion the driver demand wheel torque. Further, the front axle electric machine is commanded to provide the remaining portion of the driver demand wheel torque. The speeds of the front and rear electric machines continue at their respective previous levels. The total amount of torque that may be available to the wheels increases because both the front electric machine and the rear electric machine may supply torque to their respective axles, but the total that is available is less than at time t0 because the both the front gearbox and the rear gearbox are now engaged in the second higher gear ratio. The total amount of torque generated by the rear electric machine that is available at the rear wheels is lower than at time t0 since the rear gearbox is engaged in the second higher gear ratio. The total amount of torque generated by the front electric machine that is available at the front wheels remains near its previous level since the front gearbox is still engaged in the second higher gear ratio.

In this way, ratios of gearboxes may be changed while a vehicle is moving and changing from a first driveline operating mode to a second driveline operating mode. The sequence maintains wheel torques to follow a driver demand wheel torque so that the vehicle does not accelerate or decelerate differently than the driver's intent.

Figure 4:
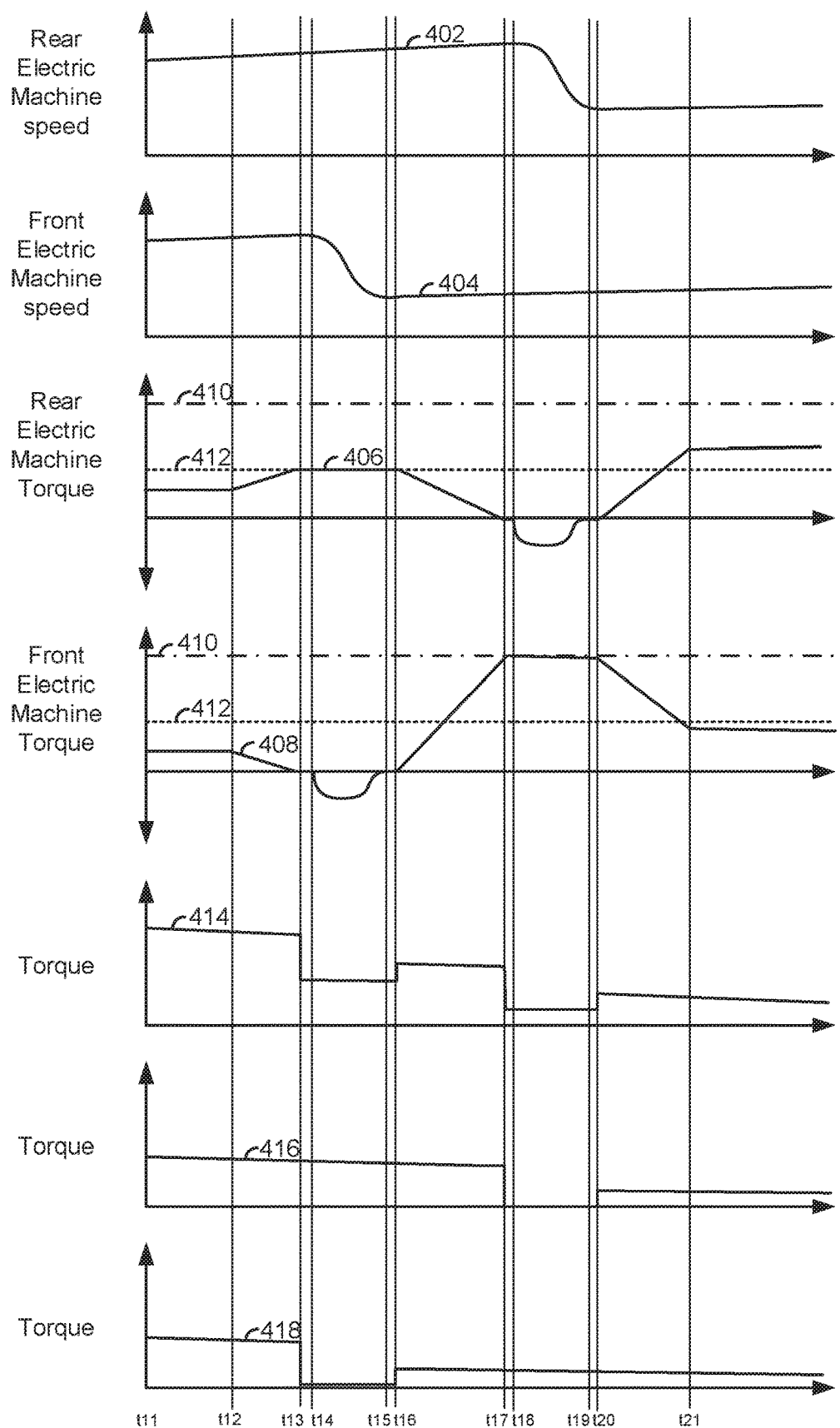

Referring now to FIG. 4, a prophetic operating sequence according to the method of FIG. 2 is shown. The vehicle operating sequence shown in FIG. 4 may be provided via the method of FIG. 2 in cooperation with the system shown in FIG. 1. The plots shown in FIG. 4 occur at the same time and are aligned in time. Vertical lines t11-t21 represent times of interest in the sequence. The sequence of FIG. 4 is performed while a vehicle is in motion and traveling without stopping the vehicle. The sequence of FIG. 4 is similar to the sequence of FIG. 3, except that driver demand in the newly selected driveline operating mode is higher than in the old driveline operating mode.

The first plot from the top of FIG. 4 is a plot of rear electric machine speed versus time. The vertical axis represents the rotational speed of the rear electric machine (e.g., 120) and the rotational speed of the rear electric machine increases in the direction of the vertical axis arrow. The horizontal axis represents time and time increases from the left side of the figure to the right side of the figure. Trace 402 represents the rotational speed of the rear electric machine.

The second plot from the top of FIG. 4 is a plot of front electric machine speed versus time. The vertical axis represents the rotational speed of the front electric machine (e.g., 135c) and the rotational speed of the front electric machine increases in the direction of the vertical axis arrow. The horizontal axis represents time and time increases from the left side of the figure to the right side of the figure. Trace 404 represents the rotational speed of the front electric machine.

The third plot from the top of FIG. 4 is a plot of rear electric machine torque versus time. The vertical axis represents the torque of the rear electric machine (e.g., 120) and the torque of the rear electric machine increases in the direction of the vertical axis arrow. The horizontal axis represents time and time increases from the left side of the figure to the right side of the figure. Trace 406 represents the torque of the rear electric machine. Dashed line trace 412 represents driver demand wheel torque as reflected at the rear electric machine based on accelerator pedal position when the axle gearboxes (e.g., 140 and 141) are engaged in their respective first low gear ratios. Dashed-dot trace 410 represents driver demand wheel torque as reflected at the rear electric machine based on accelerator pedal position when the axle gearboxes (e.g., 140 and 141) are engaged in their respective second higher gear ratios. Thus, in this example, the driver demand torques are different for when the vehicle driveline is in four wheel drive high gear ratio or four wheel drive low gear ratio.

The fourth plot from the top of FIG. 4 is a plot of front electric machine torque versus time. The vertical axis represents the torque of the front electric machine (e.g., 135c) and the torque of the front electric machine increases in the direction of the vertical axis arrow. The horizontal axis represents time and time increases from the left side of the figure to the right side of the figure. Trace 408 represents the torque of the front electric machine. Dashed line trace 412 represents driver demand wheel torque as reflected at the front electric machine based on accelerator pedal position when the axle gearboxes (e.g., 140 and 141) are engaged in their respective first lower gear ratios (this is the same level shown in the third plot from the top of FIG. 4). Dashed-dot trace 410 represents driver demand wheel torque as reflected at the front electric machine based on accelerator pedal position when the axle gearboxes (e.g., 140 and 141) are engaged in their respective second higher gear ratios (this is the same level shown in the third plot from the top of FIG. 4).

The fifth plot from the top of FIG. 4 is a plot of a total amount of torque that may be generated via the front and rear electric machines and that is available at the wheels versus time. The vertical axis represents the total amount of torque that is available at the wheels and the total amount of torque that is available at the wheels increases in the direction of the vertical axis arrow. The horizontal axis represents time and time increases from the left side of the figure to the right side of the figure. Trace 414 represents a total amount of torque that is available at the wheels.

The sixth plot from the top of FIG. 4 a plot of a total amount of torque that may be generated by the rear electric machine and that is available at the rear wheels versus time. The vertical axis represents the total amount of torque generated by the rear electric machine that is available at the rear wheels and the total amount of torque generated by the rear electric machine (e.g., 120) that is available at the rear wheels increases in the direction of the vertical axis arrow. The horizontal axis represents time and time increases from the left side of the figure to the right side of the figure. Trace 416 represents a total amount of torque that may be generated by the rear electric machine that is available at the rear wheels.

The seventh plot from the top of FIG. 4 a plot of a total amount of torque generated by the front electric machine that is available at the front wheels versus time. The vertical axis represents the total amount of torque generated by the front electric machine (e.g., 135c) that is available at the front wheels and the total amount of torque generated by the front electric machine that is available at the front wheels increases in the direction of the vertical axis arrow. The horizontal axis represents time and time increases from the left side of the figure to the right side of the figure. Trace 418 represents a total amount of torque that is available at the front wheels.

The horizontal axis of each plot corresponds to a value of zero for the vertical axis unless otherwise noted. Further, the vertical axis of each plot corresponds to a value of zero time.

At time t11, the rotational speeds of the front and rear electric machines are equal. Further, the torque of the front and rear electric machines is equal and the reflected driver demand torques for the low and high gear ratios are unequal. The driveline is in four wheel drive low gear ratio (not shown) and the available total wheel torque is at a high level. The available front wheel torque generated by the front electric machine and the available rear wheel torque generated by the rear electric machine are at high levels. The total available torque is also at a higher level.

At time t12, a driveline mode change request is made to shift the driveline from four wheel drive first lower gear ratio to four wheel drive second higher gear ratio. The front electric machine torque output is decreased and the rear electric machine torque is increased to the level to provide the driver demand torque level for the lower driveline gear ratio in response to the request. The speeds of the electric machines increase a small amount and the total available torque is reduced a small amount as the speeds of the electric machines increase. The available torques of the front and rear electric machines also decline as the speeds of the electric machines increase.

At time t13, the driveline disconnect clutch of the front axle (e.g., 138) is requested open so that the front axle gearbox ratio may be changed to the higher gear ratio in response to the front electric machine torque reaching zero and the rear electric machine torque meeting driver demanded wheel torque for the lower driveline gear ratio. The total amount of torque that may be available to the wheels is reduced as the driveline disconnect clutch of the front axle is commanded open. The total amount of torque that may be generated by the front electric machine and that is available to the front wheels is reduced to zero as the disconnect clutch of the front axle is commanded open. The total amount of torque that may be generated by the rear electric machine and that is available to the rear wheels is reduced a small amount as speeds of the front and rear wheels increase a small amount.

At time t14, the driveline disconnect clutch of the front axle (e.g., 138) is fully open and the front axle gearbox ratio is commanded to the higher gear ratio (not shown). The speed of the front electric machine begins to decrease in response to the front electric machine torque reaching zero and the front axle being shifted to the higher gear ratio. The total amount of torque that may be available to the wheels remains close to its previous level as do the total amounts of torque that may be generated by the front electric machine and the rear electric machine and that is available at the wheels.

At time t15, the driveline disconnect clutch of the front axle (e.g., 138) is requested closed in response to the front gearbox shift being complete. The total amount of torque that may be available to the wheels remains unchanged. The total amount of torque that may be generated by the front electric machine and that is available to the front wheels is also unchanged. Likewise, the total amount of torque that may be generated by the rear electric machine and that is available to the rear wheels is unchanged. The front electric machine torque is zero and the rear electric machine torque is providing the driver demand torque for the lower gear ratio at the vehicle wheels. The speed of the front axle electric machine is a lower speed and the speed of the rear axle electric machine is a higher speed due to the gearbox engaged gear ratio difference.

At time t16, the driveline disconnect clutch of the front axle (e.g., 138) is fully closed and the front axle electric machine is commanded to provide the driver demand torque at the wheels in the higher gear ratio. Further, the rear axle electric machine is commanded to zero torque. The speeds of the front and rear electric machines continue at their respective previous levels. The total amount of torque that may be available to the wheels increases because both the front electric machine and the rear electric machine may supply torque to their respective axles, but the total that is available is less than at time t11 because the front gearbox is now engaged in the second higher gear ratio. The total amount of torque generated by the front electric machine that is available at the front wheels is lower than at time t11 since the front gearbox is engaged in the second higher gear ratio. The total amount of torque generated by the rear electric machine that is available at the rear wheels remains near its previous level since the rear gearbox is still engaged in the first lower gear ratio.

At time t17, the driveline disconnect clutch of the rear axle (e.g., 123) is requested open so that the rear axle gearbox ratio may be changed to the higher gear ratio in response to the rear electric machine torque reaching zero and the front electric machine torque meeting driver demanded wheel torque for the higher gear ratio. The total amount of torque that may be available to the wheels is reduced again as the driveline disconnect clutch of the rear axle is commanded open. The total amount of torque that may be generated by the rear electric machine and that is available to the rear wheels is reduced to zero as the disconnect clutch of the rear axle is commanded open. The total amount of torque that may be generated by the front electric machine and that is available to the front wheels is near its previous level.

At time t18, the driveline disconnect clutch of the rear axle (e.g., 123) is fully open and the rear axle gearbox ratio is commanded to the higher gear ratio (not shown). The speed of the rear electric machine begins to decrease in response to the rear electric machine torque reaching zero and the rear axle being shifted to the higher gear ratio. The total amount of torque that may be available to the wheels remains close to its previous level as do the total amounts of torque that may be generated by the front electric machine and the rear electric machine and that is available at the wheels.

At time t19, the driveline disconnect clutch of the rear axle (e.g., 123) is requested closed in response to the rear gearbox shift being complete. The total amount of torque that may be available to the wheels remains unchanged. Further, the total amount of torque that may be generated by the front electric machine and that is available to the front wheels is unchanged. Likewise, the total amount of torque that may be generated by the rear electric machine and that is available to the rear wheels is unchanged. The rear electric machine torque is zero and the front electric machine torque is providing the driver demand torque at the vehicle wheels for the higher gear ratio. The speed of the rear axle electric machine is at the speed of the front axle electric machine.

At time t20, the driveline disconnect clutch of the rear axle (e.g., 123) is fully closed and the rear axle electric machine is commanded to provide a portion the driver demand wheel torque. Further, the front axle electric machine is commanded to provide the remaining portion of the driver demand wheel torque. The speeds of the front and rear electric machines continue at their respective previous levels. The total amount of torque that may be available to the wheels increases because both the front electric machine and the rear electric machine may supply torque to their respective axles, but the total that is available is less than at time t11 because the both the front gearbox and the rear gearbox are now engaged in the second higher gear ratio. The total amount of torque generated by the rear electric machine that is available at the rear wheels is lower than at time t11 since the rear gearbox is engaged in the second higher gear ratio. The total amount of torque generated by the front electric machine that is available at the front wheels remains near its previous level since the front gearbox is still engaged in the second higher gear ratio.

In this way, ratios of gearboxes may be changed while a vehicle is moving and changing from a first driveline operating mode to a second driveline operating mode when driver demand changes from a first driveline operating mode to a second driveline operating mode. The sequence increases the driver demand wheel torque when the newly requested driveline mode is partially engaged.

Figure 5:
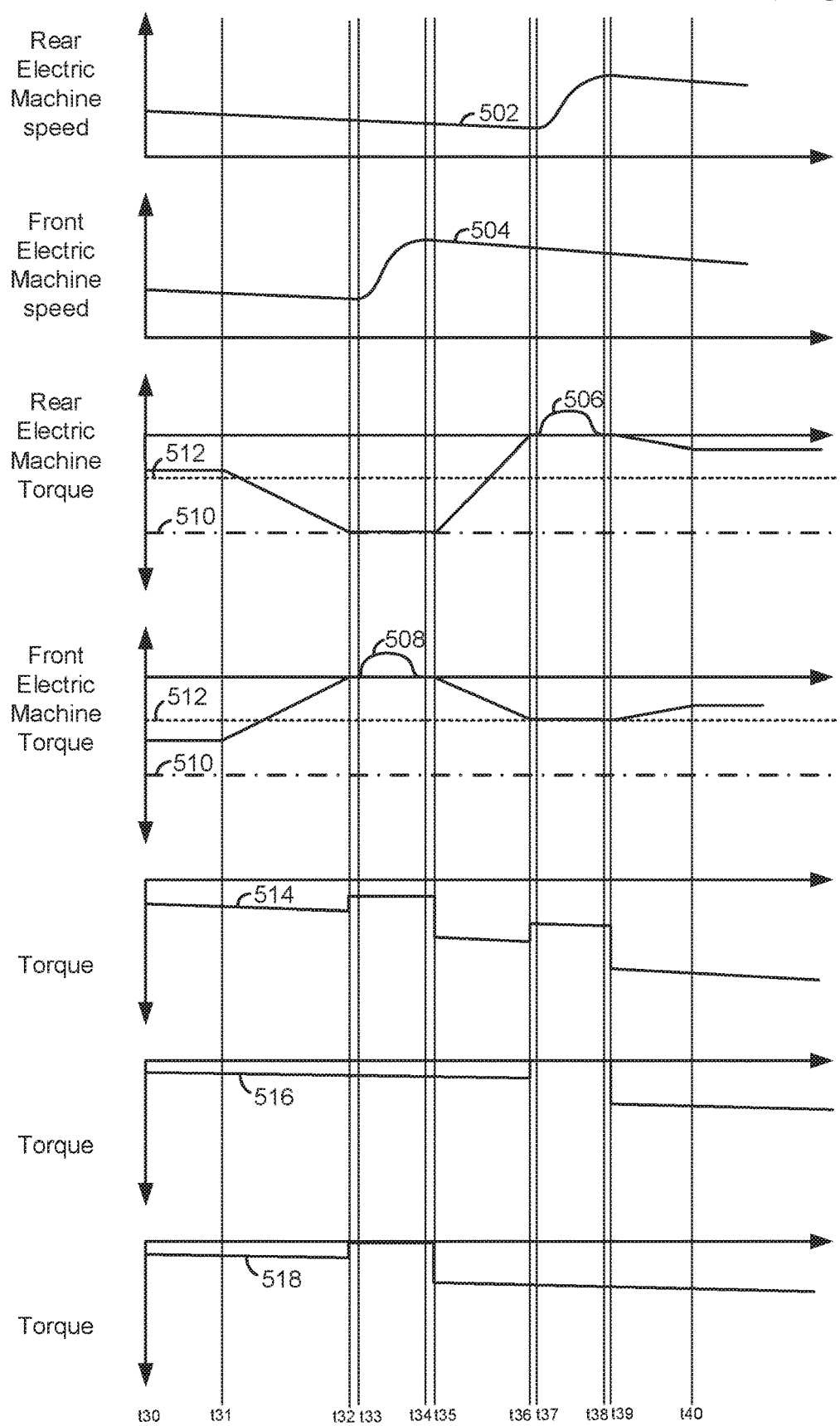

Referring now to FIG. 5, a prophetic operating sequence according to the method of FIG. 2 is shown. The vehicle operating sequence shown in FIG. 5 may be provided via the method of FIG. 2 in cooperation with the system shown in FIG. 1. The plots shown in FIG. 3 occur at the same time and are aligned in time. Vertical lines t30-t40 represent times of interest in the sequence. The sequence of FIG. 5 is performed while a vehicle is in motion and traveling without stopping the vehicle. The sequence of FIG. 5 shows a driveline mode shift change from four wheel drive gearbox low gear ratio to four wheel drive gearbox high gear ratio.

The first plot from the top of FIG. 5 is a plot of rear electric machine speed versus time. The vertical axis represents the rotational speed of the rear electric machine (e.g., 120) and the rotational speed of the rear electric machine increases in the direction of the vertical axis arrow. The horizontal axis represents time and time increases from the left side of the figure to the right side of the figure. Trace 502 represents the rotational speed of the rear electric machine.

The second plot from the top of FIG. 5 is a plot of front electric machine speed versus time. The vertical axis represents the rotational speed of the front electric machine (e.g., 135c) and the rotational speed of the front electric machine increases in the direction of the vertical axis arrow. The horizontal axis represents time and time increases from the left side of the figure to the right side of the figure. Trace 504 represents the rotational speed of the front electric machine.

The third plot from the top of FIG. 5 is a plot of rear electric machine torque versus time. The vertical axis represents the torque of the rear electric machine (e.g., 120) and the magnitude of torque of the rear electric machine increases in the direction of the vertical axis arrow. Torque values below the horizontal axis are negative. The horizontal axis represents time and time increases from the left side of the figure to the right side of the figure. Trace 506 represents the torque of the rear electric machine. Dashed line trace 512 represents driver demand wheel torque as reflected at the rear electric machine based on accelerator pedal position when the axle gearboxes (e.g., 140 and 141) are engaged in their respective first low gear ratios. Dashed-dot trace 510 represents driver demand wheel torque as reflected at the front and rear electric machines based on accelerator pedal position when the axle gearboxes (e.g., 140 and 141) are engaged in their respective second high gear ratios.

The fourth plot from the top of FIG. 5 is a plot of front electric machine torque versus time. The vertical axis represents the torque of the front electric machine (e.g., 135c) and the torque of the front electric machine increases in the direction of the vertical axis arrow. Torque values below the horizontal axis are negative. The horizontal axis represents time and time increases from the left side of the figure to the right side of the figure. Trace 508 represents the torque of the front electric machine. Dashed line trace 512 represents driver demand wheel torque as reflected at the front electric machine based on accelerator pedal position when the axle gearboxes (e.g., 140 and 141) are engaged in their respective first low gear ratios (this is the same level shown in the third plot from the top of FIG. 5). Dashed-dot trace 510 represents driver demand wheel torque as reflected at the front and rear electric machines based on accelerator pedal position when the axle gearboxes (e.g., 140 and 141) are engaged in their respective second high gear ratios (this is the same level shown in the third plot from the top of FIG. 5).

The fifth plot from the top of FIG. 5 is a plot of a total amount of torque that may be generated via the front and rear electric machines and that is available at the wheels versus time. The vertical axis represents the total amount of torque that is available at the wheels and the total amount of torque that is available at the wheels increases in the direction of the vertical axis arrow. The horizontal axis represents time and time increases from the left side of the figure to the right side of the figure. Trace 514 represents a total amount of torque that is available at the wheels.

The sixth plot from the top of FIG. 5 a plot of a total amount of torque that may be generated by the rear electric machine and that is available at the rear wheels versus time. The vertical axis represents the total amount of torque generated by the rear electric machine that is available at the rear wheels and the total amount of torque generated by the rear electric machine (e.g., 120) that is available at the rear wheels increases in the direction of the vertical axis arrow. The horizontal axis represents time and time increases from the left side of the figure to the right side of the figure. Trace 516 represents a total amount of torque that may be generated by the rear electric machine that is available at the rear wheels.

The seventh plot from the top of FIG. 5 a plot of a total amount of torque generated by the front electric machine that is available at the front wheels versus time. The vertical axis represents the total amount of torque generated by the front electric machine (e.g., 135c) that is available at the front wheels and the total amount of torque generated by the front electric machine that is available at the front wheels increases in the direction of the vertical axis arrow. The horizontal axis represents time and time increases from the left side of the figure to the right side of the figure. Trace 518 represents a total amount of torque that is available at the front wheels.

The horizontal axis of each plot corresponds to a value of zero for the vertical axis unless otherwise noted. Further, the vertical axis of each plot corresponds to a value of zero time.

At time t30, the rotational speeds of the front and rear electric machines are equal and the vehicle is decelerating. Further, the magnitude of torque of the front electric machine is greater than the magnitude of the rear electric machines. Torque of the front and rear electric machines are negative and the electric machines are in a regeneration mode producing electrical charge. The driveline is in four wheel drive high gear ratio (not shown) and the total available wheel torque is at a lower level. The available front wheel torque generated by the front electric machine and the available rear wheel torque generated by the rear electric machine are at very low levels.

At time t31, a driveline mode change request is made to shift the driveline from four wheel drive second higher gear ratio to four wheel drive first lower gear ratio. The front electric machine torque output is decreased toward zero and the rear electric machine torque magnitude is increased in response to the request. The speeds of the electric machines decrease a small amount and the magnitude of the total available torque is increased a small amount as the speeds of the electric machines decrease. The magnitudes of the available torques of the front and rear electric machines also increase a small amount as the speeds of the electric machines decrease.

At time t32, the driveline disconnect clutch of the front axle (e.g., 138) is requested open so that the front axle gearbox ratio may be changed to the lower gear ratio in response to the front electric machine torque reaching zero and the rear electric machine torque meeting driver demanded wheel torque. The magnitude of the total amount of torque that may be available to the wheels is decreased as the driveline disconnect clutch of the front axle is commanded open. The magnitude of the total amount of torque that may be generated by the front electric machine and that is available to the front wheels is reduced to zero as the disconnect clutch of the front axle is commanded open. The total amount of torque that may be generated by the rear electric machine and that is available to the rear wheels is increased a small amount as speeds of the front and rear wheels decrease a small amount.

At time t33, the driveline disconnect clutch of the front axle (e.g., 138) is fully open and the front axle gearbox ratio is commanded to the lower gear ratio (not shown). The speed of the front electric machine begins to increase in response to the front electric machine torque reaching zero and the front axle being shifted to the lower gear ratio. The total amount of torque that may be available to the wheels remains close to its previous level as do the total amounts of torque that may be generated by the front electric machine and the rear electric machine and that is available at the wheels.

At time t34, the driveline disconnect clutch of the front axle (e.g., 138) is requested closed in response to the front gearbox shift being complete. The total amount of torque that may be available to the wheels remains unchanged. The total amount of torque that may be generated by the front electric machine and that is available to the front wheels is unchanged. The total amount of torque that may be generated by the rear electric machine and that is available to the rear wheels is unchanged. The front electric machine torque is zero and the rear electric machine torque is providing the driver demand torque at the vehicle wheels. The speed of the front axle electric machine is a lower speed and the speed of the rear axle electric machine is a higher speed.

At time t35, the driveline disconnect clutch of the front axle (e.g., 138) is fully closed and the front axle electric machine is commanded to provide the driver demand torque at the wheels. Further, the rear axle electric machine is commanded to zero torque. The speeds of the front and rear electric machines continue at their respective previous levels. The magnitude of the total amount of torque that may be available to the wheels increases because the front electric machine is coupled to a gearbox that is engaged in a first lower gear ratio. The total amount of torque generated by the front electric machine that is available at the front wheels is greater than at time t30 since the front gearbox is engaged in the first lower gear ratio. The total amount of torque generated by the rear electric machine that is available at the rear wheels remains near its previous level since the rear gearbox is still engaged in the second higher gear ratio.

At time t36, the driveline disconnect clutch of the rear axle (e.g., 123) is requested open so that the rear axle gearbox ratio may be changed to the higher gear ratio in response to the rear electric machine torque reaching zero and the front electric machine torque meeting driver demanded wheel torque. The magnitude of the total amount of torque that may be available to the wheels is decreased as the driveline disconnect clutch of the rear axle is commanded open. The magnitude of the total amount of torque that may be generated by the rear electric machine and that is available to the rear wheels is reduced to zero as the disconnect clutch of the rear axle is commanded open. The magnitude of the total amount of torque that may be generated by the front electric machine and that is available to the front wheels is near its previous level.

At time t37, the driveline disconnect clutch of the rear axle (e.g., 123) is fully open and the rear axle gearbox ratio is commanded to the lower gear ratio (not shown). The speed of the rear electric machine begins to increase in response to the rear electric machine torque reaching zero and the rear axle being shifted to the lower gear ratio. The total amount of torque that may be available to the wheels remains close to its previous level as do the total amounts of torque that may be generated by the front electric machine and the rear electric machine and that is available at the wheels.

At time t38, the driveline disconnect clutch of the rear axle (e.g., 123) is requested closed in response to the rear gearbox shift being complete. The total amount of torque that may be available to the wheels remains unchanged. The total amount of torque that may be generated by the front electric machine and that is available to the front wheels is unchanged. The total amount of torque that may be generated by the rear electric machine and that is available to the rear wheels is unchanged. The rear electric machine torque is zero and the front electric machine torque is providing the driver demand torque at the vehicle wheels. The speed of the rear axle electric machine is at the speed of the front axle electric machine.

At time t39, the driveline disconnect clutch of the rear axle (e.g., 123) is fully closed and the rear axle electric machine is commanded to provide a portion the driver demand wheel torque. Further, the front axle electric machine is commanded to provide the remaining portion of the driver demand wheel torque. The speeds of the front and rear electric machines continue at their respective previous levels. The magnitude of the total amount of torque that may be available to the wheels increases because both the front electric machine and the rear electric machine may supply torque to their respective axles, and the total that is available is greater than at time t30 because the both the front gearbox and the rear gearbox are now engaged in the first lower gear ratio. The total amount of torque generated by the rear electric machine that is available at the rear wheels is greater than at time t30 since the rear gearbox is engaged in the first lower gear ratio. The total amount of torque generated by the front electric machine that is available at the front wheels remains near its previous level since the front gearbox is still engaged in the first lower gear ratio.

In this way, ratios of gearboxes may be changed and electric machines may be operated in a regeneration mode during the driveline mode change. The sequence maintains wheel torques to follow a driver demand wheel torque so that the vehicle does not decelerate differently than the driver's intent.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
   requesting a change in driveline operating mode while a vehicle is moving;
     shifting a first gearbox to a requested gear in response to the requested change in driveline operating mode while the vehicle is moving and a second gearbox is engaged in a gear;
     adjusting rotational speed of a first electric machine to a rotational speed of a shaft of the first gearbox while the vehicle is propelled via a second electric machine that is coupled to the second gearbox;
     engaging a first clutch to couple the first electric machine to the shaft of the first gearbox;
     opening the first clutch before shifting the first gearbox to the requested gear; and
     adjusting a torque of the first electric machine to zero while operating the first electric machine in a torque control mode in response to the requested change in driveline operating mode and before opening the first clutch.

2. The method of claim 1, where the first gearbox is coupled to a first axle, and where the second gearbox is coupled to a second axle.

3. The method of claim 1, further comprising operating the first electric machine in a torque control mode in response to the first clutch being engaged.

4. The method of claim 3, further comprising adjusting a torque of the second electric machine to zero while operating the second electric machine in a torque control mode in response to the first clutch being engaged.

5. The method of claim 4, further comprising disengaging a second clutch in response to the torque of the second electric machine being zero.

6. A driveline operating method, comprising:
   requesting a change in driveline operating mode while a vehicle is moving;
   shifting a first gearbox to a requested gear in response to the requested change in driveline operating mode while the vehicle is moving and a second gearbox is engaged in a gear;
   adjusting rotational speed of a first electric machine to a rotational speed of a shaft of the first gearbox while the vehicle is propelled via a second electric machine that is coupled to the second gearbox;
   engaging a first clutch to couple the first electric machine to the shaft of the first gearbox;
   operating the first electric machine in a torque control mode in response to the first clutch being engaged;
   adjusting a torque of the second electric machine to zero while operating the second electric machine in a torque control mode in response to the first clutch being engaged; and
   disengaging a second clutch in response to the torque of the second electric machine being zero.

* * * * *